Nov. 18, 1930.  T. NAGEL  1,782,244
BRIQUETTE OVEN
Filed Jan. 3, 1927    2 Sheets-Sheet 1
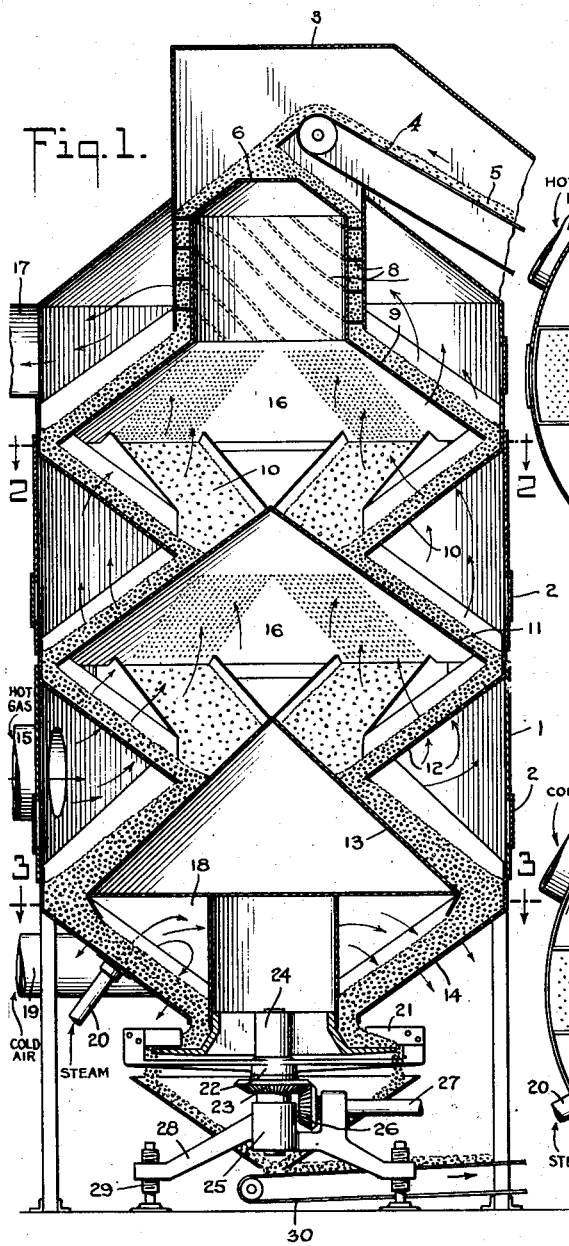
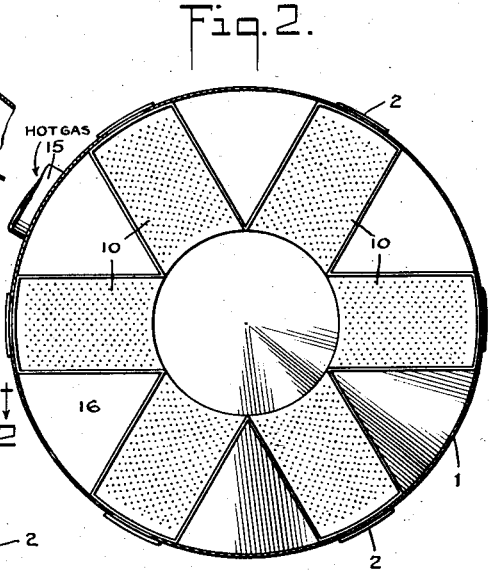
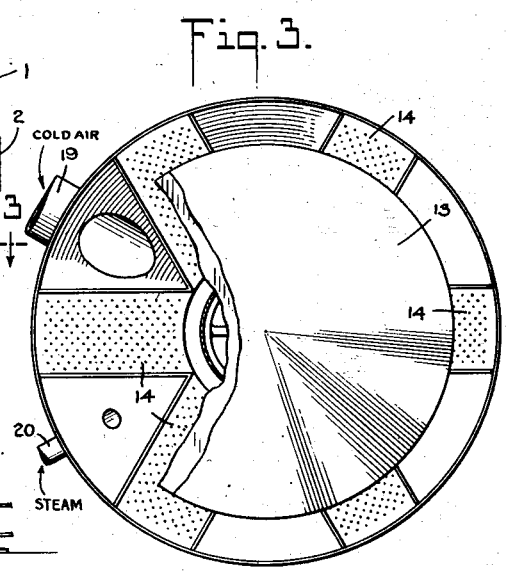
Theodore Nagel
INVENTOR
BY
ATTORNEY Nov. 18, 1930. T. NAGEL 1,782,244
BRIQUETTE OVEN
Filed Jan. 3, 1927 2 Sheets-Sheet 2
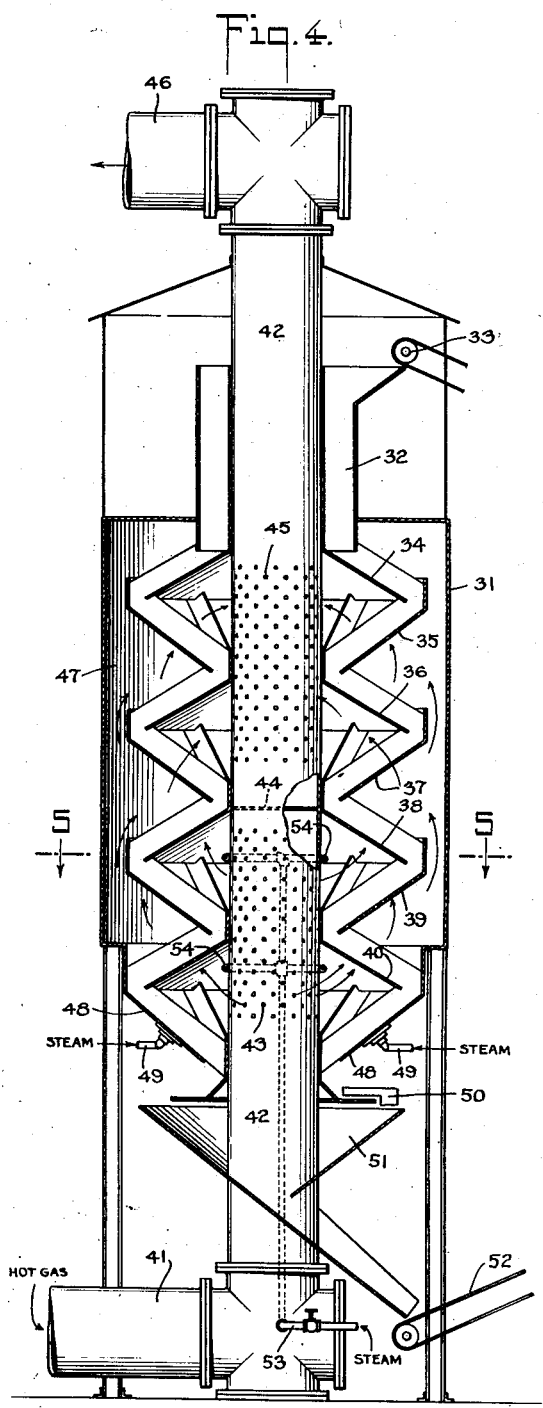
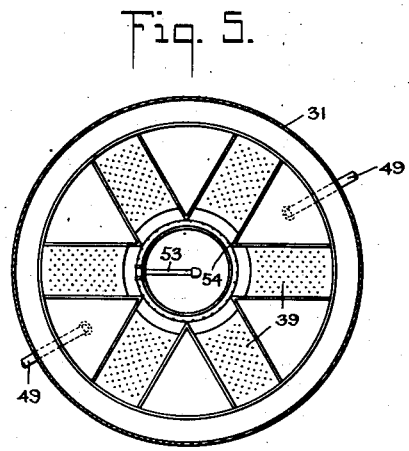
Theodore Nagel
INVENTOR
ATTORNEY Patented Nov. 18, 1930

1,782,244

UNITED STATES PATENT OFFICE

THEODORE NAGEL, OF BROOKLYN, NEW YORK

BRIQUETTE OVEN

Application filed January 3, 1927. Serial No. 158,789.

This invention relates to the treatment of briquettes and other material of granular or lump nature by heating in order to improve the qualities thereof and more particularly it relates to a means for drying or baking the same.

Heretofore several types of ovens for baking briquettes and the like had been proposed and among these was the endless conveyor type of oven, which has been used extensively in the industry. One form of oven consisted essentially of a pair of relatively long endless chains having conveyor buckets or pans suspended between the same and passing over a large number of sets of sprockets, whereby the chains hung in vertical loops. Suitable motive power was provided to cause the chains and buckets to slowly move from one end of the oven to the other, passing over and under the successive sprockets and traveling up and down progressing forward at the same time.

In order to provide an oven of a commercial size, that is having a capacity of baking 25 tons of briquettes an hour, it is necessary that the oven be of very large size. For example, a 25 ton conveyor type oven may be 155 feet long, 13 feet wide and 36 feet high, containing 30 to 35 loops of endless conveyor about 2000 feet long with approximately 1500 buckets.

A structure of this kind, although suitable for the work to be performed, is very expensive and because of the large number of buckets, the great length of chain and the many sprockets and bearings in the structure, difficulties frequently arise necessitating shut-downs and repairs.

My invention is intended to obviate the difficulties and disadvantages inherent in the present type of oven used for baking or drying briquettes, it being among the objects thereof to provide an oven which is simple in construction, which is inexpensive, which contains practically no moving parts and which requires no special attention.

In practicing my invention I provide a continuous oven including a series of chutes vertically disposed and so placed that material passing from one chute to the next reverses its direction of travel and the angle at which the chutes are placed in approximately the angle of repose of the briquettes or other material which pass over the same. In order to provide an oven of large capacity, I arrange a plurality of sets of such chutes, not necessarily but preferably radiating from a common center or axis and surrounded by a suitable casing. Hot gases are caused to pass through the chutes which are perforated and through material contained thereon, the gas being caused to pass successively through the chutes whereby the heat therein is utilized to the maximum degree. I also provide means for cooling the briquettes, prior to the discharge thereof from the oven in order to prevent oxidation and burning upon contact with the air after discharge.

In the accompanying drawings constituting a part hereof, and in which like reference characters indicate like parts;

Figure 1 is a vertical cross-sectional view of a preferred form of my new oven, some parts being shown diagrammatically and other parts being shown in elevation for the sake of clearness;

Figure 2 is a horizontal cross-sectional view taken along the line 2—2 of Figure 1;

Figure 3 is a horizontal cross-sectional view taken along the line 3—3 of Figure 1, some parts being shown in elevation;

Figure 4 is a vertical cross-sectional view of a somewhat modified form of my invention, some parts being shown in elevation, and Figure 5 is a horizontal cross-sectional view thereof taken along the line 5—5 of Figure 4.

The oven consists essentially of a cylindrical steel shell 1, having a number of openings at various points, closed by doors or shutters 2, to allow of access to the oven for repairs and inspection. The housing 3, on the top of the oven encloses a conveyor belt 4, which brings raw briquettes 5 from any suitable source to the distributor 6, whereby briquettes 5 are caused to pass into cylindrical hopper 7 which is provided with a series of vanes 8 for the proper distribution and guidance of the briquettes into the several chutes. The vanes 8 also serve the purpose of avoiding the formation of a thick layer of briquettes at a stage in the manufacture thereof, when the briquettes are relatively weak and a great weight thereon would tend to crush the same.

There is provided a plurality of vertically disposed chutes 9, 10, 11, 12, 13 and 14 of which chutes 9, 10, 11, 12 and 14 are perforated to allow the passage of gas therethrough and chute 13 is imperforate or of solid material. Each of the said chutes is placed at an angle which is approximately the angle of repose of the briquettes, but preferably the angle is slightly greater than said angle of repose. This arrangement allows the briquettes to slide and distribute themselves evenly to form beds of uniform thickness over the entire area of the chutes to maintain uniform resistance throughout to the passage of the heated gas. The alternate chutes 9, 11 and 13 extend from a central point outwardly towards the shell 1 of the oven and the alternate chutes 10, 12 and 14 extend from the shell 1 inwardly. Each of the successive chutes terminate a short distance from the next chute. Such an arrangement allows an unimpeded passage of briquettes from the top to the bottom of the oven.

As shown more clearly in Figures 2 and 3, I provide a plurality of sets of such chutes radiating from the center of the oven to the outer shell, thereby utilizing a comparatively small space for a relatively large column of briquettes.

Near the bottom of the oven is an opening 15 for hot gases which may be products of combustion from any suitable source, the products passing only through the perforated portions of chutes 12, 11, 10 and 9, being unable to pass between the chutes because of the solid material 16 therebetween. In passing upwardly the gases come in contact with successive layers of briquettes, thereby subjecting the briquettes to the heated gas for a period long enough for them to become heated throughout to the proper temperature. The gases flow in a direction counter current to the briquettes and then pass out through exit opening 17.

At the bottom of the oven is provided chamber 18 having an inlet pipe 19 for cold air and also an inlet opening 20 for steam, both of which are adapted to pass through the baked briquettes on chutes 14 and through the perforations thereof.

Any suitable type of discharge mechanism may be used but I generally provide at the outlet end of chutes 14 a number of scrapers 21 mounted on a hub 22, driven by a gear 23 which in turn is mounted on a shaft held in bearings 24 and 25. A driving gear 26 mounted on a shaft 27 may be caused to rotate at any desired speed. The discharge mechanism is mounted upon a framework or spider 28, resting upon adjustable screws thereby allowing of adjustment of the width of the opening for scrapers 21 and the associated mechanism to vary the discharge or the speed of removal of baked briquettes from the oven. A conveyor belt 30 or other suitable means removes the briquettes as they are discharged from the oven.

In operation it is necessary at first to fill the oven to its normal capacity with briquettes or other material and hot gases are caused to pass through the several sets of vertically aligned chutes entering at opening 15 and passing out at 17. Conveyor 30 and scrapers 21 are set in motion at the proper rate to remove the briquettes from the oven and conveyor 4 is caused to move at such a rate as to supply briquettes at the same rate as they are removed. The briquettes may be made as is well known in the art, but I prefer to use a binder therefor which consists of a mixture of organic adhesive material and phosphoric acid, or other binders that set up or harden upon heating, the briquettes being formed in the usual type of press and then carried by conveyor 4 into my oven.

The time of passage of the briquettes through the oven may be varied according to the requirements of curing the binder, but generally I utilize such a speed that the briquettes are heated throughout while passing through the heating zone. They then pass through the cooling zone where cold air or steam or both, are forced through the baked briquettes cooling the same and at the same time removing therefrom any dust which may have been formed during the passage through the oven. The briquettes constantly change their contact surfaces while moving through the furnace thereby exposing all the surface most of the time to the hot gas. They do not tumble over each other but merely slide very slowly so that they suffer very little abrasion in passing through the oven.

In Figure 4 I have shown a somewhat modified form of oven which consists of shell 31 having a hopper 32 at the upper end thereof with a conveyor 33 for bringing briquettes into the oven. There is provided a series of chutes 34, 35, 36, 37, 38, 39 and 40 vertically placed and radiating from a common center as in the case of the oven shown in Figure 1, the sets of chutes being perforated to allow gases to pass through the same. Hot gases for baking or drying the briquettes enter horizontal pipe 41, and are transmitted into vertical pipe 42 which is placed in the center of the oven and which is provided with a series of perforations 43 at the lower end thereof, to allow the hot gases to pass from the pipe 42 into the chamber containing the chutes upon which the briquettes slide. A baffle 44 limits the passage of hot gas in an upwardly direction and above the said baffle is a second series of perforations 45 to allow the gases which have passed through the briquettes to be withdrawn from the oven and out through pipe 46.

At the bottom of the oven are chutes 48 provided with steam inlet pipes 49 whereby the baked briquettes may be subjected to the cooling action of the steam to prevent burning thereof as they pass into the air. Suitable mechanism, indicated diagrammatically by scraper 50, it is provided for removing the baked briquettes from the oven and into hopper 51 from which the briquettes are removed to any suitable point by conveyor 52. There is further provided a source of steam 53 and a series of perforated pipes 54 as a precautionary means whereby steam may be injected into the briquettes during the baking operation so that combustion thereof may be prevented if accidentally the temperature of the briquettes reaches such a point that there is danger of combustion.

It will be noted that my new type of oven consists merely of a series of vertically disposed chutes preferably radiating from a common center and that there are no moving parts necessary for the passage of briquettes through the oven. It is merely necessary to provide a means for bringing briquettes to the oven and for removing the baked briquettes therefrom.

The construction is very simple and may be utilized for ovens of varying capacities by changing the diameter of the oven without increasing the height thereof. The cost of an oven of this character compared to that of a typical oven above described of the prior art is probably one-quarter thereof, and the cost of repairs, which in the old type of oven was a very serious matter, is practically eliminated in the present oven.

Although I have described my invention, illustrating two forms of ovens made in accordance therewith, it is to be understood that my invention is not limited to the same as it is apparent that other forms and arrangements may be made within the scope of the ideas set forth above. It is not absolutely essential in my invention that the sets of chutes be placed in a circular arrangement of the oven, and it is not even essential that there be more than one set of chutes, although the superimposed arrangements of chutes as described is desirable because of space economy for capacity and efficiency. I may place grids or perforated covers on some or all of the chutes to confine the material and provide a uniform bed thereof. I have shown six sets of chutes radiating from a common center but it is obvious that the number thereof may be changed at will. These and other changes may be made in my invention within the scope thereof and without departing from the principles herein described.

What I claim is:

1. A continuous oven comprising a plurality of chutes placed at angles approximating the angle of repose of the material to be baked, each chute being of substantially uniform width to prevent crowding and separating of the material, some of said chutes being perforated for the passage of hot gases to contact with said material, said chutes radiating from a central axis and a common hopper having spiral vanes therein for feeding material to said sets of chutes.

2. A continuous oven comprising means to feed material to the apparatus, a plurality of sets of radial chutes adapted to direct the fed material toward the center of the oven, each chute being of substantially uniform width to prevent crowding and separating of the material, means between the sets to receive the material from the chutes and direct it toward the periphery of the oven, and means to remove the material from the oven.

3. A continuous oven comprising feeding means for material to be treated, a set of radial chutes directed downwardly and toward the center of the oven, a second set of radial chutes to direct the material received from the first set downwardly and toward the periphery of the oven, each chute being of substantially uniform width to prevent crowding and separating of the material, and means to remove the treated material from the oven.

4. A continuous oven comprising feeding means for a material to be treated, a set of radial chutes adapted to direct material downwardly and toward the center of the oven, a conical element having a series of radial chutes thereon adapted to receive the material from the first set and direct the material therefrom downwardly and toward the oven periphery, each chute being of substantially uniform width to prevent crowding and separating of the material, the conical element projecting upwardly above the bottom of the first set of chutes, and means to remove the treated material from the oven.

5. A continuous oven comprising means to feed material to the main body thereof, a plurality of sets of radial chutes arranged at an angle to the vertical axis of the oven, each chute being of substantially uniform width to prevent crowding and separating of the material, one set of chutes being adapted to direct the fed material away from the said axis and another set of chutes being adapted to receive the material from the first set and direct the same toward the said axis.

6. A continuous oven comprising means to feed material to the main body thereof, a set of radial chutes arranged at an angle to the vertical axis of the oven to receive the fed material and direct it downwardly through the oven, each chute being of substantially uniform width to prevent crowding and separating of the material and having individual upstanding side edges to confine the moving material to the chute.

7. A continuous oven comprising means to feed material to the main body thereof, an element below the feeding means and including a frustro conical surface, upstanding spaced apart walls on said element forming therebetween individual chutes radial to the vertical axis of the oven, each chute being of substantially uniform width to prevent crowding and separating of the material.

8. A continuous oven comprising means to feed material to the main body thereof, an element below the feeding means having a frustro conical surface and adapted to receive material thereon from the feeding means, upstanding spaced apart walls on said element forming therebetween individual chutes radial to the vertical axis of the oven, each chute being of substantially uniform width to prevent crowding and separating of the material, that portion of the said element included between the upstanding walls being perforated to permit passage of hot gases therethru.

9. A continuous oven comprising a feed hopper, a series of radial chutes having parallel sides for confining the material to the chutes, adapted to receive the material from the hopper, each chute being of substantially uniform width to prevent crowding and separating of the material, the chutes being arranged at an angle to the vertical axis of the oven, and openings in the chutes to permit passage of hot gases through the chutes to contact with the material passing through the oven.

10. A continuous oven comprising means to feed material to the main body thereof, an element below the feeding means having a frustro conical surface and adapted to receive material thereon from the feeding means, upstanding spaced apart walls on said element forming therebetween individual chutes radial to the vertical axis of the oven, each chute being of substantially uniform width to prevent crowding and separating of the material, that portion of the frustro conical surface of the said element not constituting the bottom of the chutes being imperforate.

11. A continuous oven comprising means to feed material to the main body thereof, a series of elements below the feeding means including frustro conical surfaces, one of which is in inverted relation to another, upstanding walls on each element forming therebetween chutes radial to the vertical axis of the oven, each chute being of substantially uniform width to prevent crowding and separating of the material, one element having its chutes jointed at the top thereof and another element having its chutes joined at the bottom thereof.

12. A continuous oven comprising a feed hopper, a series of radial chutes having material restricting sides adapted to receive material from the hopper and conducting same downwardly through the oven, said chutes alternately approaching the vertical axis of the oven and the periphery of the oven, each chute being of substantially uniform width to prevent crowding and separating of the material, and means for discharging the treated material from the oven.

13. A continuous oven comprising a vertically arranged cylindrical shell having a restricted entrance neck comprising spaced apart walls concentric with the vertical axis of the shell, a spiral chute in said neck for feeding material through the neck to the body of the oven, and means within the oven to continuously feed material therethru.

14. A continuous oven comprising a vertically disposed cylindrical shell having an entering neck comprising spaced apart walls concentric with the vertical axis of the shell, and a chute including a vane extending between the walls to direct material thereon downwardly into the oven, the vane constituting the chute bottom being arranged substantially at the normal angle of repose of the material to be treated in the oven to permit the said material to slide along the chute and insure passage of the material through the entering neck in a layer without crowding or separation.

In testimony whereof, I have hereunto subscribed my name this 27th day of December, 1926.

THEODORE NAGEL.